United States Patent
Su et al.

(10) Patent No.: US 11,158,081 B2
(45) Date of Patent: Oct. 26, 2021

(54) AUGMENTED REALITY DEVICE AND POSITIONING METHOD

(71) Applicant: ADAT Technology Co., Ltd., Taipei (TW)

(72) Inventors: Kai-Hung Su, Tainan (TW); Mu-Heng Lin, Tainan (TW)

(73) Assignee: ADAT Technology Co., Ltd., Taipei (TW)

( * ) Notice: Subject to any disclaimer, the term of this patent is extended or adjusted under 35 U.S.C. 154(b) by 0 days.

(21) Appl. No.: 16/847,637

(22) Filed: Apr. 13, 2020

(65) Prior Publication Data
US 2021/0201525 A1    Jul. 1, 2021

(30) Foreign Application Priority Data
Dec. 25, 2019 (TW) ................... 108147692

(51) Int. Cl.
 G06T 7/70    (2017.01)
 G06T 7/64    (2017.01)
 G06K 9/62    (2006.01)

(52) U.S. Cl.
 CPC .............. *G06T 7/70* (2017.01); *G06K 9/6214* (2013.01); *G06T 7/64* (2017.01); *G06T 2207/10028* (2013.01)

(58) Field of Classification Search
 CPC ... G06T 7/70; G06T 7/64; G06T 2207/10028; G06K 9/6214
 USPC .......................................................... 382/154
 See application file for complete search history.

(56) References Cited

U.S. PATENT DOCUMENTS

| | | | |
|---|---|---|---|
| 2007/0031064 A1* | 2/2007 | Zhao | G06T 7/33 |
| | | | 382/285 |
| 2014/0306866 A1 | 10/2014 | Miller et al. | |
| 2017/0347120 A1* | 11/2017 | Chou | H04N 19/147 |
| 2018/0046648 A1 | 2/2018 | McKinnon et al. | |
| 2018/0315247 A1 | 11/2018 | Van Andel | |
| 2019/0155374 A1 | 5/2019 | Miller et al. | |

(Continued)

FOREIGN PATENT DOCUMENTS

| | | |
|---|---|---|
| JP | 2017191351 A | 10/2017 |
| TW | 201341758 A | 10/2013 |

(Continued)

OTHER PUBLICATIONS

F.A.Donoso et al., "How do ICP variants perform when used for scan matching terrain point clouds?" Robotics and Autonomous Systems, vol. 87, Jan. 2017, pp. 147-161.

(Continued)

*Primary Examiner* — Amandeep Saini
(74) *Attorney, Agent, or Firm* — CKC & Partners Co., LLC

(57) ABSTRACT

A positioning method is provided for an electrical device including a depth sensor and an inertial measurement unit (IMU). The positioning method includes: calculating an initial position and an initial direction of the electrical device according to signals of the IMU; obtaining an environment point cloud from a database, and obtaining a partial environment point cloud according to the initial position and the initial direction; obtaining a read point cloud by the depth sensor; and matching the read point cloud and the partial environment point cloud to calculate an updated position and an updated direction of the electrical device.

8 Claims, 7 Drawing Sheets

(56) References Cited

U.S. PATENT DOCUMENTS

2019/0156569 A1* 5/2019 Jung .................. G06T 7/12
2019/0323844 A1 10/2019 Yendluri et al.

FOREIGN PATENT DOCUMENTS

| TW | 201425877 A | 7/2014 |
| TW | 201447235 A | 12/2014 |
| TW | 201709127 A | 3/2017 |
| TW | 201743078 A | 12/2017 |
| TW | 201804315 A | 2/2018 |
| TW | M598411 U | 7/2020 |

OTHER PUBLICATIONS

Fang Wang et al., "A survey of iterative closest point algorithm" IEEE, 2017, pp. 4395-4399.
M. Lamine Tazir et al., "CICP: Cluster Iterative Closest Point for sparse-dense point cloud registration", Robotics and Autonomous Systems, vol. 108, Oct. 2018, pp. 66-86.

* cited by examiner

AUGMENTED REALITY DEVICE AND POSITIONING METHOD

RELATED APPLICATIONS

This application claims priority to Taiwan Application Serial Number 108147692 filed Dec. 25, 2019, which is herein incorporated by reference.

BACKGROUND

Field of Invention

The present invention relates to a positioning method which may be applied to an augmented reality device or a general electrical device.

Description of Related Art

The recognition of a spatial position and an attitude is used in scenarios where computing elements are combined with real space. Conventionally, the acquisition of the spatial position and the attitude is mainly carried out by using an inertial measurement unit. However, the inertial measurement unit may have integral drift and lack of location information in long-term usage. Global positioning information system (GPS) may be used in outdoor fields to obtain position information, but it is not reliable in indoor fields. Simultaneous localization and mapping (SLAM) is used to acquire the spatial position and the attitude in the indoor fields without GPS. However, continuous field model updating is redundant and consumes a lot of computing resources in a fixed space field for industrial applications where SLAM may also cause map data errors if the personnel constantly move between areas.

SUMMARY

Embodiments of the present disclosure provide a positioning method for an electrical device including a depth sensor and an inertial measurement unit. The positioning method includes: calculating an initial position and an initial direction of the electrical device according to signals obtained from the inertial measurement unit; obtaining an environment point cloud from a database, and obtaining a partial environment point cloud from the environment point cloud according to the initial position and the initial direction; obtaining a read point cloud by the depth sensor; and matching the read point cloud and the partial environment point cloud to calculate an updated position and an updated direction of the electrical device.

In some embodiments, matching the read point cloud and the partial environment point cloud includes solving a following equation (1).

$$\arg\min_{(R,t)} \Sigma_{i=1}^{N} w_i \|Rp_i + t - q_i\|^2 \quad (1)$$

In the equation (1), $p_i$ is an $i^{th}$ point of the read point cloud, $q_i$ is an $i^{th}$ point of the partial environment point cloud, the point $q_i$ is matched to the point $p_i$, $w_i$ is a weight corresponding to the point $p_i$ and the point $q_i$, R is a translation matrix, t is a shift vector, and N is a number of points of the read point cloud.

In some embodiments, the weight $w_i$ is negatively correlated to a distance between the point $q_i$ and $(Rp_i + t)$.

In some embodiments, each of the point $p_i$ and the point $q_i$ includes an X coordinate, a Y coordinate, a Z coordinate, and a normal vector.

In some embodiments, the positioning method further includes: obtaining the point $p_i$ and multiple neighboring points thereof from the read point cloud; and performing a principle component analyze to the point $p_i$ and the neighboring points to obtain multiple eigenvalues and multiple principle components, and setting the principle component corresponding to smallest one of the eigenvalues as the normal vector of the point $p_i$.

In some embodiments, each of the point $p_i$ and the point $q_i$ further includes a curvature factor. The positioning method further includes: dividing the smallest one of the eigenvalues by a sum of the eigenvalues to calculate the curvature factor.

From another aspect, embodiments of the present disclosure provide an augmented reality device including an inertial measurement unit, a depth sensor and a processor. The processor is configured to perform steps of: calculating an initial position and an initial direction of the augmented reality device according to signals obtained from the inertial measurement unit; obtaining an environment point cloud from a database, and obtaining a partial environment point cloud from the environment point cloud according to the initial position and the initial direction; obtaining a read point cloud by the depth sensor; and matching the read point cloud and the partial environment point cloud to calculate an updated position and an updated direction of the electrical device.

In the device and method described above, a rough position is determined according to the inertial measurement unit, and then the position is updated by point cloud registration. Accordingly, a precise position is provided and the corn potation of the point cloud registration is reduced.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

The positioning method of the disclosure adopts technologies of point cloud, inertial measurement unit (IMU), and point cloud registration (PCR). A point cloud of space is extracted by a depth sensor, and the point cloud is combined with the IMU and PCR to determine a position and a direction in the space. The positioning technology can be used to connect the virtual and real relationship between computer programs and a real environmental in industrial applications. On the other hand, personnel are guided to complete tasks in specific fields by augmented reality (AR) device object design. Conventionally, the spatial positioning with a single IMU has the disadvantages of being unable to accurately measure the position, and accumulating errors under long-term use. The proposed method calculates the precise position and direction by scanning a point cloud, providing a rough position of the point cloud in a known environment through IMU, and matching the scanned point cloud and the point cloud of the 3D model of the environment by the PCR algorithm. Accordingly, it can get correct spatial positioning information and increase the reliability of mixed reality design of AR.

Figure 1:
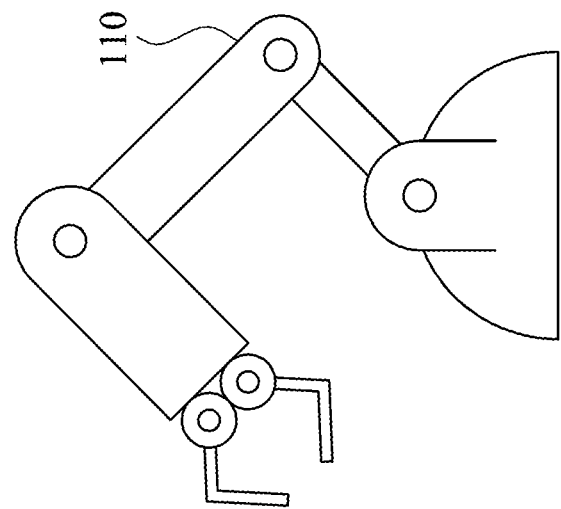
FIG. 1 is an application scenario of an augmented reality device in accordance with an embodiment.
Figure 1:
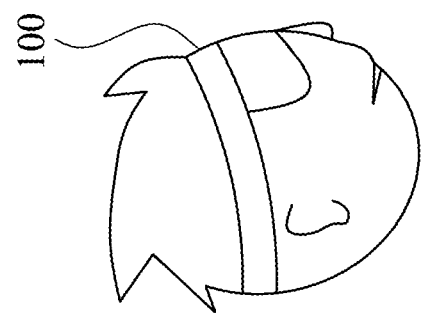

FIG. 1 is an application scenario of an augmented reality device in accordance with an embodiment. An AR device 100 is smart glasses in the embodiment of FIG. 1, but it may be a mask, a smart phone, a tablet, etc. The appearance of the AR device 100 is not limited in the disclosure. A user can wear the AR device 100 to move indoors, for example, in an industrial environment where one or more machine tool 110 is disposed. The point cloud of the machine tool 110 is known, so the AR device 100 can identify the point cloud of the machine tool 110 to acquire the position of the AR device 100.

Figure 2:
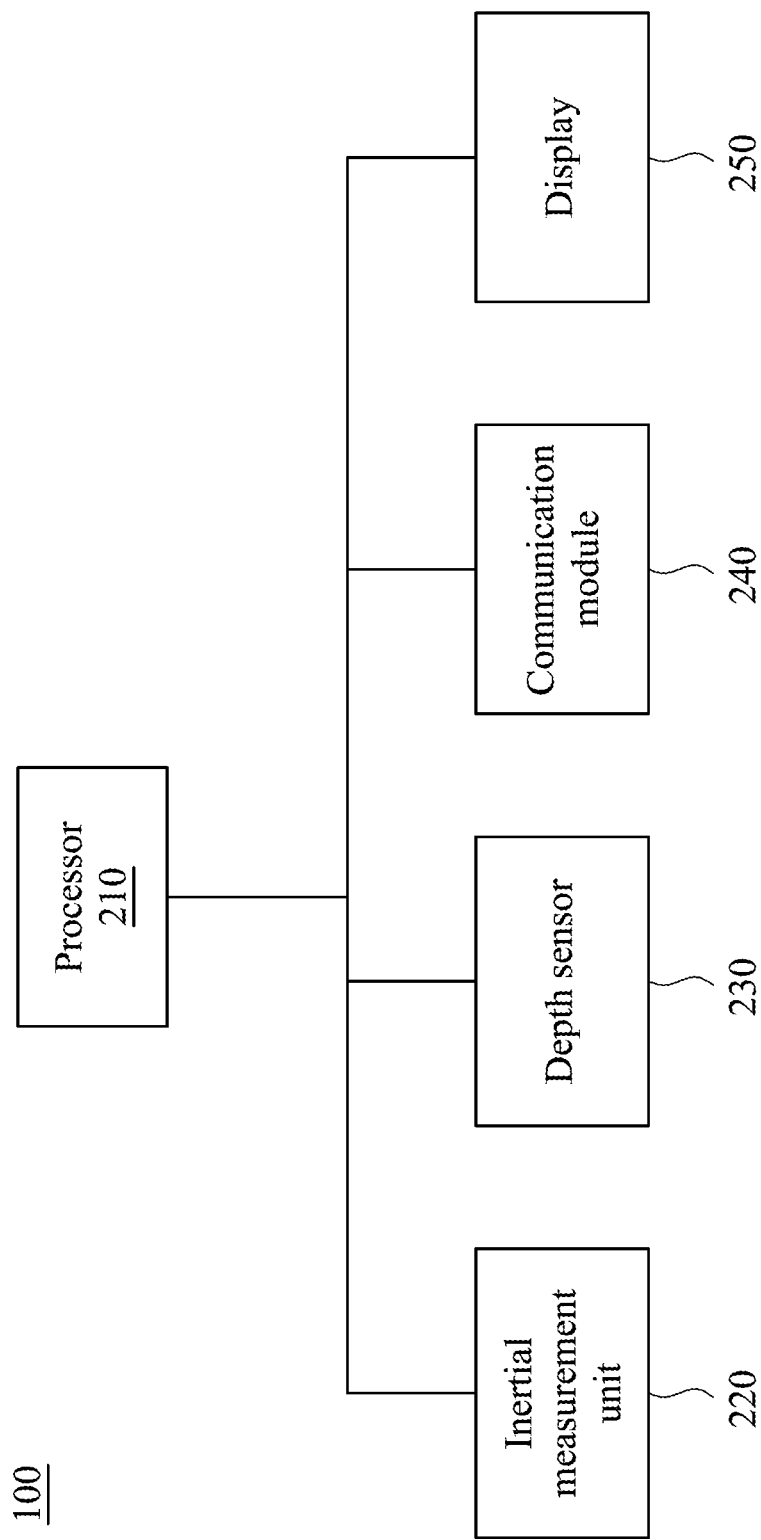
FIG. 2 is a schematic block diagram of the augmented reality in accordance with an embodiment.

FIG. 2 is a schematic block diagram of the augmented reality device in accordance with an embodiment. Referring to FIG. 2, the AR device 100 includes a processor 210, an inertial measurement unit 220, a depth sensor 230, a communication module 240, and a display 250. The processor 210 may be a central processing unit, a microprocessor, a microcontroller, a digital signal processor, an image processing chip, an application-specific integrated circuit, etc. The inertial measurement unit 220 may include an acceleration sensor, an angular velocity sensor, a magnetometer, etc. The depth sensor 230 may include an infrared emitter, an infrared sensor, dual cameras, structured light sensing device or any device that can detect depth of a field. The communication module 240 may be a circuit capable of providing communication means such as the Internet, local area networks (LANs), wide area networks (WANs), cellular networks, near field communications (NFC), infrared (IR), Bluetooth, WiFi. The display 250 may include an organic light emitting diode (OLED) display, a liquid crystal display, or any suitable display. Not all components of the AR device 100 is illustrated in FIG. 2 for simplicity.

Figure 3:
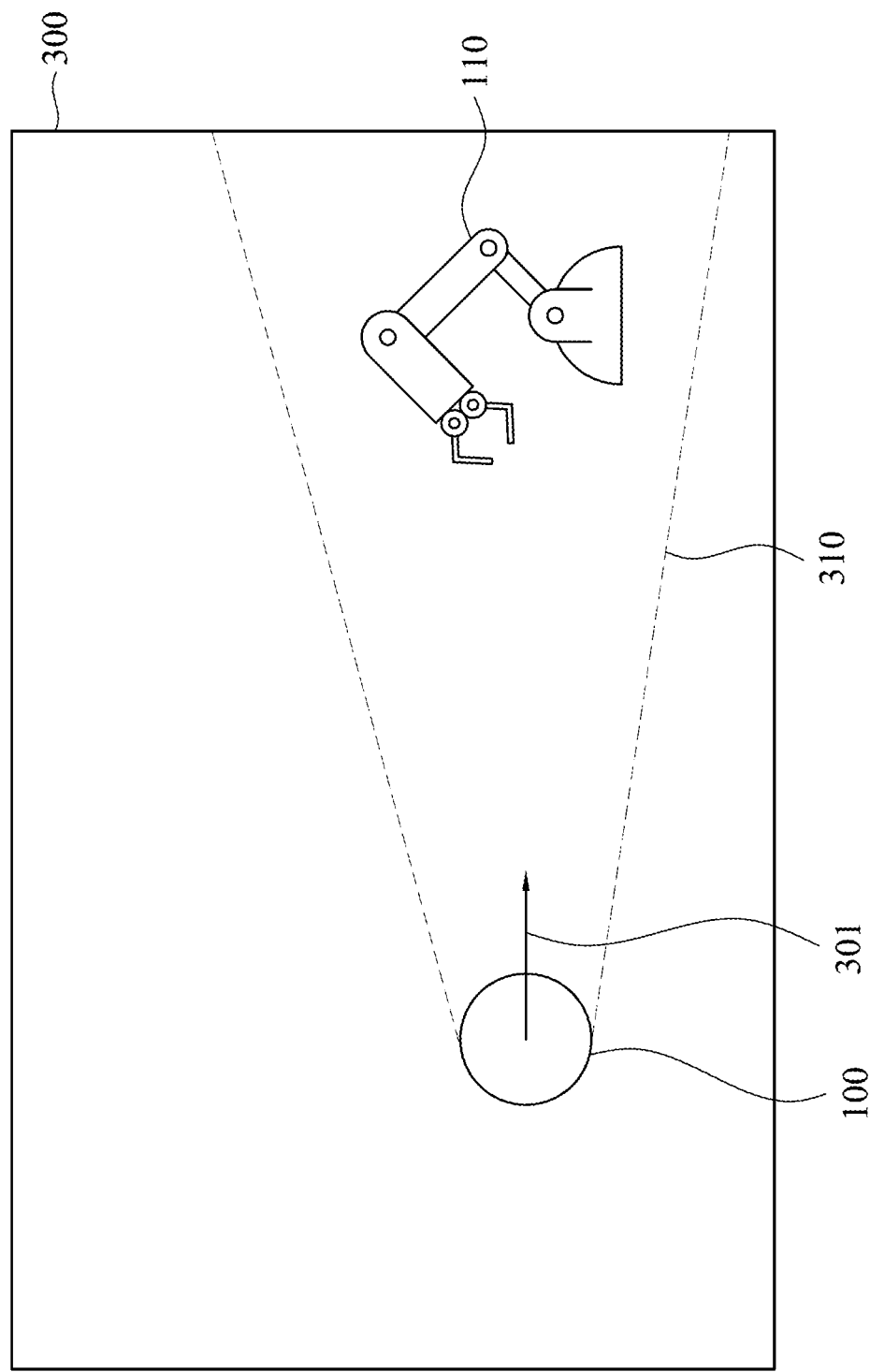
FIG. 3 is a top view of the application scenario of the augmented reality device in accordance with an embodiment.
Figure 4:
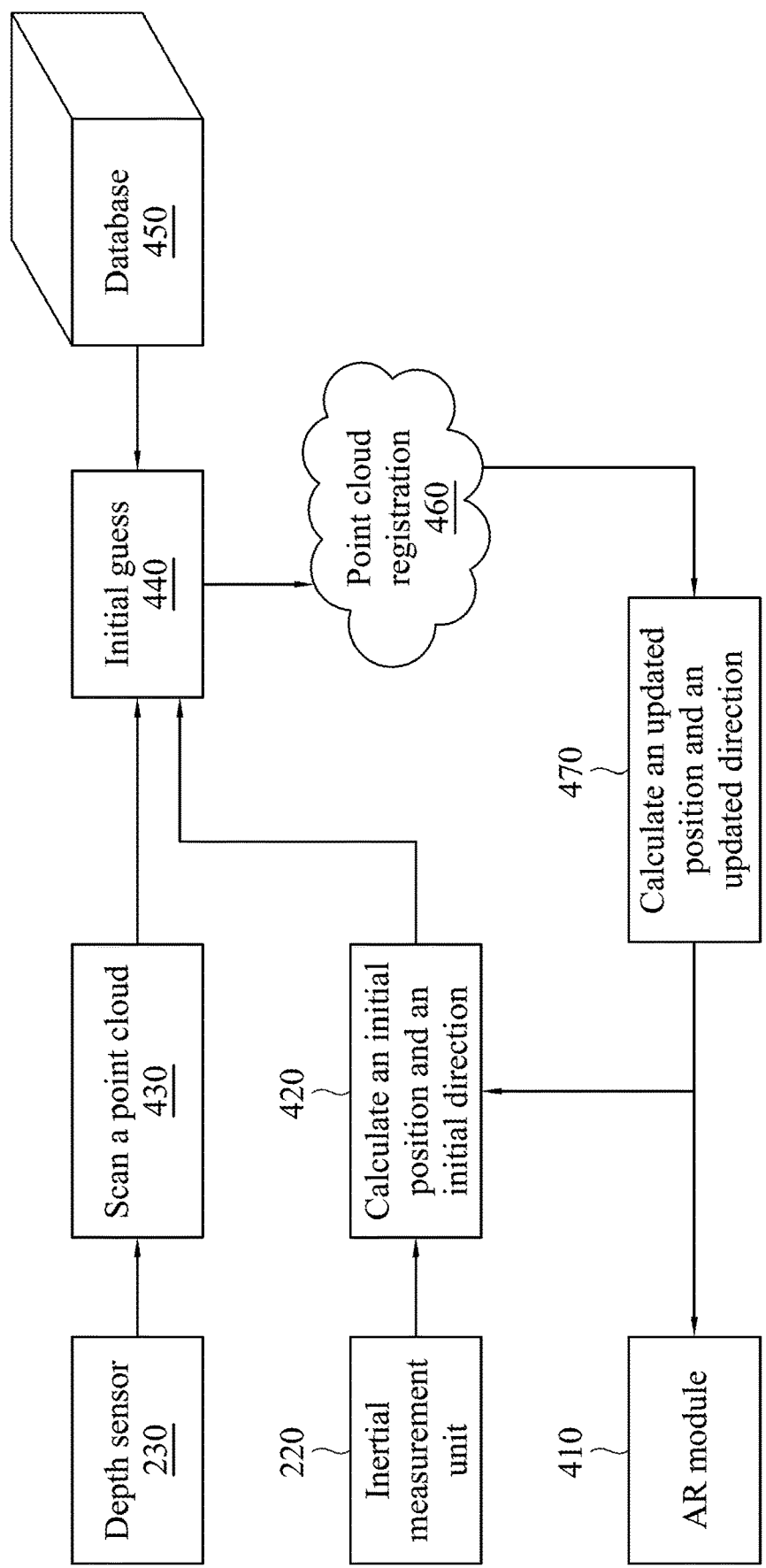
FIG. 4 is a flow chart of a positioning method in accordance with an embodiment.

FIG. 3 is a top view of the application scenario of the augmented reality device in accordance with an embodiment. FIG. 4 is a flow chart of a positioning method in accordance with an embodiment. In the embodiment of FIG. 3 and FIG. 4, the AR device 100 moves in an indoor environment 300. Each step of the method described below is performed by the processor 210 of the AR device 100 or a cloud server (not shown) which receives the required data from the AR device 100 and then transmits the computation result to the AR device 100.

In step 420, an initial position and an initial direction 301 are calculated according to signals obtained from the inertial measurement unit 220. For example, the acceleration values measured by the internal measurement unit 220 are integrated to obtain velocity values which are integrated to obtain the initial position, and the initial direction 301 is obtained according to the angular acceleration and the direction of the magnetic force.

In step 430, scanning points is performed by the depth sensor 230 to get a point cloud represented as a matrix $P=[p_1, p_2, \ldots, p_N] \in R^{M \times N}$ (may be referred to a set of points) including multiple points where the $i^{th}$ point is represented as a vector $p_i$. M, N, and i are positive integers. N is the number of the points in the matrix P. M is the length of each vector $p_i$. In detail, the depth sensor 230 scans an environment object (e.g. the tool machine 110) to get a distance between each point of the environment object and the AR device 100. Coordinates of the points are calculated according to the distance and the position and direction of the AR device 100. Therefore, each vector $p_i$ at least includes an X coordinate, a Y coordinate, and a Z coordinate. In some embodiments, each vector $p_i$ further includes a normal vector and a curvature factor (that will be described below). The vector $p_i$ is taken as an example for general description. The point cloud generated by the depth sensor 230 is referred to a read point cloud.

In step 440, an environment point cloud is obtained from a database 450. The environment point cloud includes point clouds of one or more tool machine 110 in the indoor environment 300. The environment point cloud is represented as a matrix $Q=[q_1, q_2, \ldots, q_N] \in R^{M \times N}$. Similarly, the environment point cloud includes multiple points where the $i^{th}$ point is represented as a vector $q_i$. The environment point cloud can be created in advance. For example, a 3D file may be converted into the point cloud. The 3D file may be generated by various software such as Autocad, Solidwork, or Catia. In the embodiments the depth sensor 230 can generate the environment point cloud without the 3D file by processes of stitching, noise filtering, sharpening, gridization, etc. In some embodiments, the environment point cloud is provided by another computer system.

An initial guess is also performed in the step 440. The environment point cloud includes the points of all objects in the indoor environment, and there will be redundant computation if all objects are matched to the read point cloud. In some embodiments, the depth sensor 230 has a view angle which is used to calculate a field of view 310 with the initial position and the initial direction. Only the points in the field of view 310 are extracted from the environment point cloud as a partial environment point cloud which is still represented as Q for simplicity. The partial environment point cloud is matched to the read point cloud to reduce the computation. In some embodiments, there is transformation of translation and shift between the read point cloud and the partial environment point cloud. The transformation is written as the following equation (1).

$$q_i = Rp_i + t, i = 1 \ldots N \qquad (1)$$

R is a translation matrix with size of M×M, and t is shift vector with length of M. In some embodiments, the translation matrix R and the shift vector t are initialized by the initial direction and the initial position calculated in the step 420. In some embodiments, the translation matrix R and the shift vector t are initialized randomly.

Figure 5:
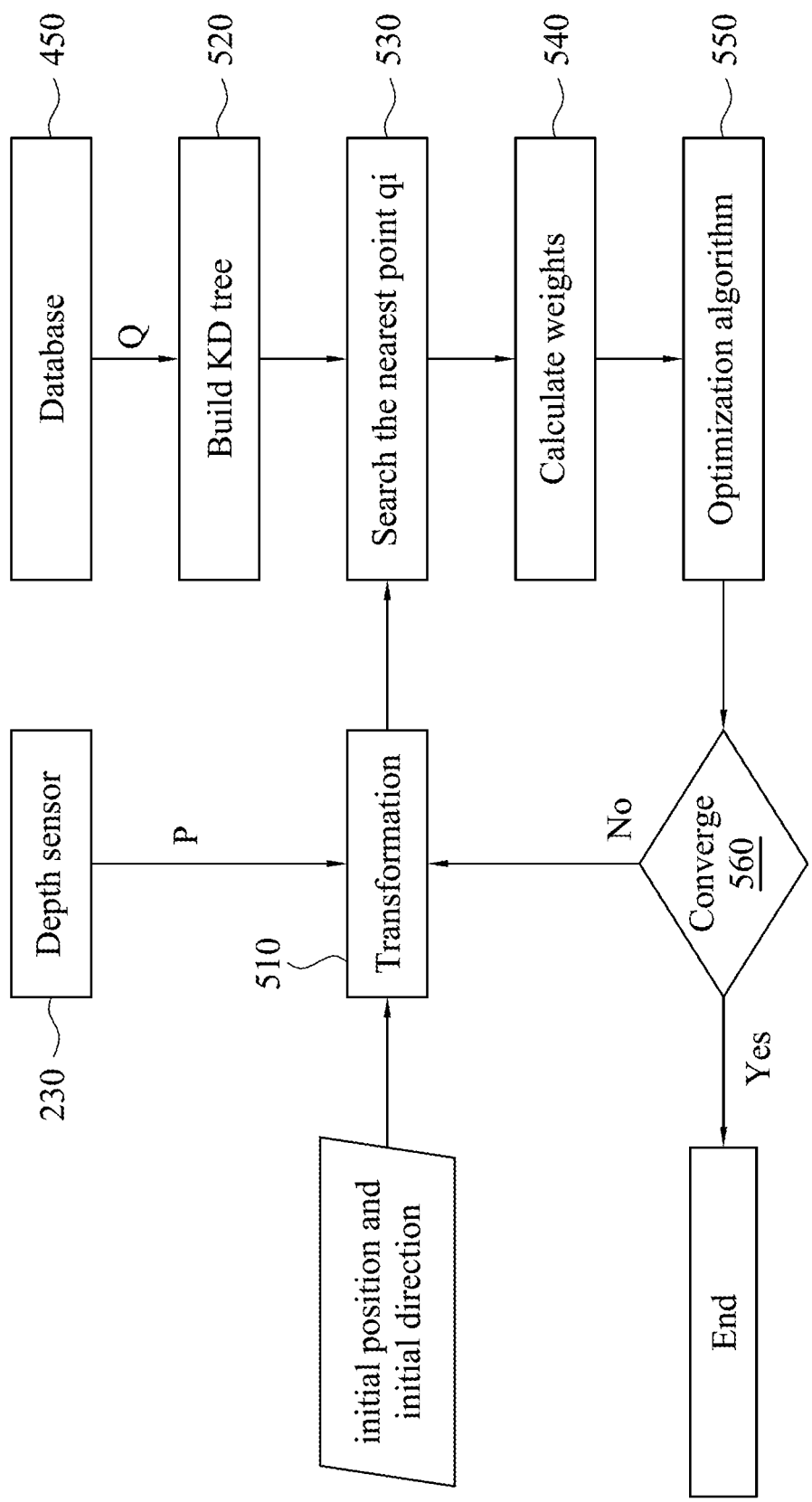
FIG. 5 is a schematic flow chart of an iterative closest point algorithm in accordance with an embodiment.

In step 460, a point cloud registration (PCR) algorithm is performed. An iterative closest point (ICP) algorithm is adopted in the embodiment, but other registration algorithms may be adopted in other embodiments. FIG. 5 is a schematic flow chart of the ICP algorithm in accordance with an embodiment. Referring to FIG. 5, in step 510, the point $p_i$ is transformed into ($Rp_i$+t).

In step 520, a KD tree is generated according to the partial environment point cloud Q for quickly searching the point $q_i$. Other data structures such as BSP tree, KDB tree, R tree, R+ tree CELL tree, Quad tree, and Octree may be adopted in other embodiments.

In step 530, the read point cloud P is matched to the partial environment point cloud Q, that is, the nearest point $q_i$ for each point $p_i$ is searched to form a pair ($p_i$,$q_i$). Note that the distance between the point $q_i$ and the transformed point ($Rp_i$+t) is calculated when searching the nearest point. The distance between the point $q_i$ and ($Rp_i$+t) may be Euclidean distance (i.e. L2-norm of the difference vector) or other suitable distance.

In step 540, a weight $w_i$ is calculated for each pair ($p_i$,$q_i$). The weight $w_i$ is negatively correlated to the distance between the point $q_i$ and ($Rp_i$+t), and the distance is represented as a real number d herein. For example, if the real number d is greater than a threshold, the weight $w_i$ is set to be 0. If the real number d is less than or equal to the threshold, the weight $w_i$ is set to be the inverse or a decreasing function of the real number d. The decreasing function may be $e^{-d}$ and so on. The weight $w_i$ is used to remove the outlier (e.g. background) of the point cloud. In this way, the background would not affect the matching result.

In step 550, an optimization algorithm is performed to calculate the matrix R and the vector t that is written as the following equation (2).

$$\arg\min_{(R,t)} \Sigma_{i=1}^{N} w_i \|Rp_i + t - q_i\|^2 \quad (2)$$

The above optimization algorithm can be solved by formulas or by a search method (e.g. a genetic algorithm) which is not limited in the disclosure. For example, the formulas may include the following equations (3)-(5).

$$t = \tilde{q} - R\tilde{p} \quad (3)$$

$$\tilde{p} = \frac{\sum_{i=1}^{N} w_i p_i}{\sum_{i=1}^{N} w_i} \quad (4)$$

$$\tilde{q} = \frac{\sum_{i=1}^{N} w_i q_i}{\sum_{i=1}^{N} w_i} \quad (5)$$

Next, a matrix S is generated according to the following equation (6). The singular value decomposition (SVD) is performed to the matrix S as written in the equation (7). The translation matrix R is calculated based on the matrices U and V as the following equation (8).

$$\begin{pmatrix} | & & | \\ (p_1 - \tilde{p}) & \cdots & (p_N - \tilde{p}) \\ | & & | \end{pmatrix} \begin{pmatrix} w_1 & 0 & 0 \\ 0 & \ddots & 0 \\ 0 & 0 & w_N \end{pmatrix} \begin{pmatrix} - & (q_1 - \tilde{q})^T & - \\ & \vdots & \\ - & (q_N - \tilde{q})^T & - \end{pmatrix} \quad (6)$$

$$svd\{S\} = U\Sigma V^T \quad (7)$$

$$R = V \begin{pmatrix} 1 & 0 & 0 \\ 0 & 1 & 0 \\ 0 & 0 & \det(VU^T) \end{pmatrix} U^T \quad (8)$$

In step 560, it is determined whether the updating converges. For example, if the magnitude of the altering of the translation matrix R and the shift vector t is less than a predetermined value, then it is determined that the updating converges. In some embodiments, it is determined that the updating converges if a particular number of the iterations have been performed. If it does not converge, go back to the step 510 to transform the point $p_i$ based on the new translation matrix R and the new shift vector t.

Referring to FIG. 3 and FIG. 4, an updated position and an updated direction are calculated in step 470. To be specific, after the read point cloud and the partial environment point cloud are matched, if some matched points $q_i$ belong to the tool machine 110, it means the tool machine 110 is in the field of view 310 of the AR device 100. In addition, the distance and the direction of the AR device 100 relative to the tool machine 110 can be acquired based on the pair ($p_i$,$q_i$), and accordingly the updated position and the updated direction of the direction of the AR device 100 can be calculated because the position of the tool machine 110 is known. The initial direction and the initial position calculated in the step 420 would be replaced with the updated position and the updated direction. In some embodiments, the updated position and the updated direction are also transmitted to an augmented reality module 410 which is executed by the processor 210 to determine which information is shown on the display 250.

Figure 6:
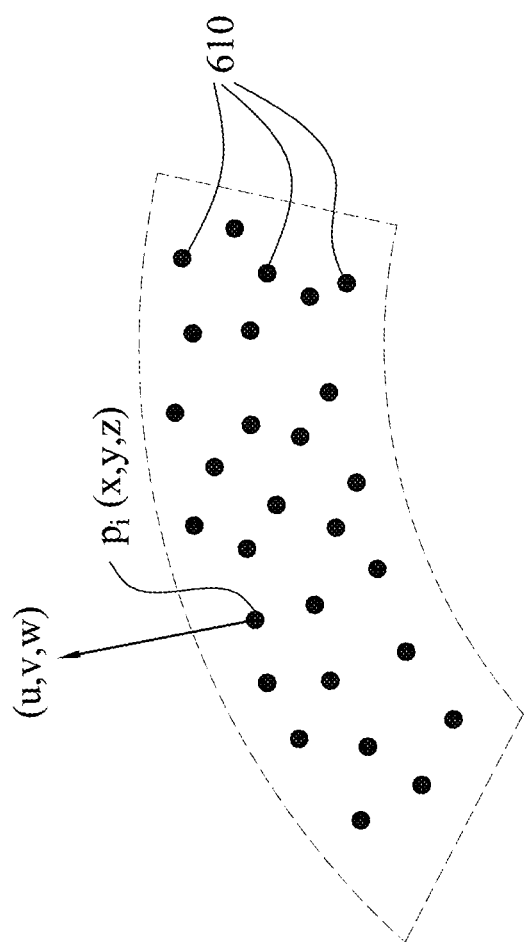
FIG. 6 is a schematic diagram of calculating a normal vector in accordance with an embodiment.

In some embodiments, an additional normal vector and a curvature factor are calculated for each point of the point cloud. Therefore, each of the point $p_i$ and the point $q_i$ can be represented as a vector (x,y,z,u,v,w,c) with length of 7. The elements of (x,y,z) are X coordinate, Y coordinate, and Z coordinate respectively. The elements of (u,v,w) constitute the normal vector, and c is the curvature factor. FIG. 6 is a schematic diagram of calculating the normal vector in accordance with an embodiment. Referring to FIG. 6, take the point $p_i$(x,y,z) as an example, neighboring points 610 of the point $p_i$ in a small area (or a predetermined number of neighboring points) are obtained. A principle component analyze (PCA) algorithm is performed to the point $p_i$ and the neighboring points 610 to get eigenvalues $\lambda_1$, $\lambda_2$, and $\lambda_3$ and principle components. The eigenvalues $\lambda_1$, $\lambda_2$, and $\lambda_3$ are arranged in decreasing order. People in the art should be able to under the PCA algorithm, and therefore it will not be described in detail. Each eigenvalue corresponds to one of the principle components. Each principle component is a vector with length of 3. The principle component corresponding to the largest eigenvalue $\lambda_1$ is a basis which can represent the point $p_i$ and the neighboring points 610 most. Since the $p_i$ and the neighboring points 610 are approximately on a two-dimensional surface which is spanned by two bases, the third bases should represent the normal vector of the surface. In other words, the principle component corresponding to the smallest eigenvalue $\lambda_3$ is set to be the normal vector (u,v,w) of the point $p_i$. Moreover, the eigenvalue $\lambda_3$ should be relatively small if the surface is flat; and the eigenvalue $\lambda_3$ should be relatively large if the surface is curved. Therefore, the eigenvalue $\lambda_3$ can be used to calculate the curvature factor c. In some embodiments, the smallest eigenvalue is divided by the sum of the three eigenvalues to calculate the curvature factor c as written in the following equation (9).

$$c = \frac{\lambda_3}{\lambda_1 + \lambda_2 + \lambda_3} \quad (9)$$

The aforementioned operation can be performed to each point of read point cloud and partial environment point cloud, and the original vectors (x,y,z) would be replaced with the vectors (x,y,z,u,v,w,c). In the embodiment, each point is more descriptive because the normal vector and the curvature factor are added into the matching of the ICP algorithm that will improve matched pair ($p_i$, $q_i$).

Figure 7:
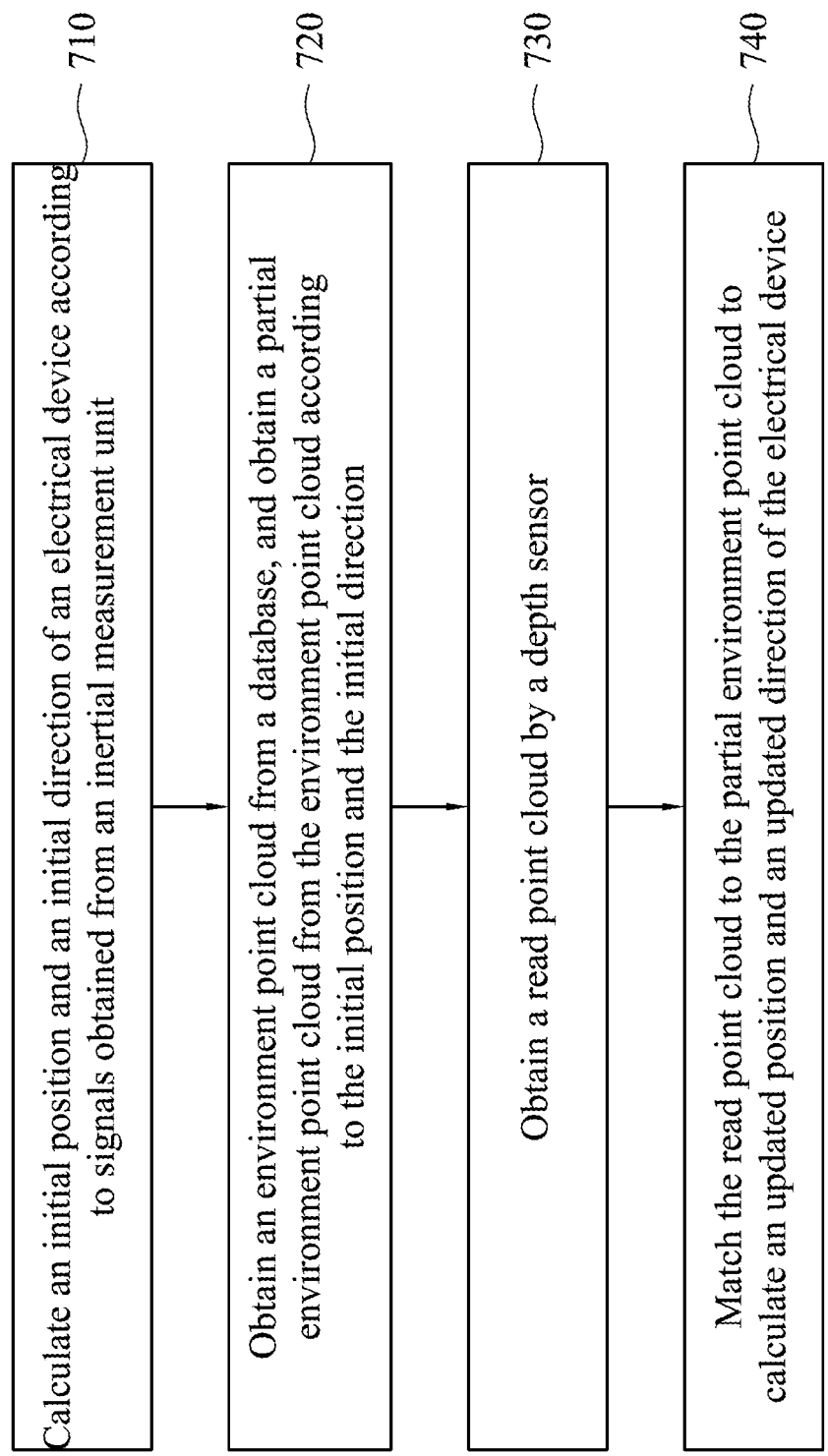
FIG. 7 is a schematic flow chart of a positioning method in accordance with an embodiment.

FIG. 7 is a schematic flow chart of a positioning method in accordance with an embodiment. Referring to FIG. 7, in step 710, an initial position and an initial direction of an electrical device are calculated according to signals obtained from an inertial measurement unit. In step 720, an environment point cloud is obtained from a database, and a partial environment point cloud is obtained from the environment point cloud according to the initial position and the initial direction. In step 730, a read point cloud is obtained by a depth sensor. In step 740, the read point cloud is matched to the partial environment point cloud to calculate an updated position and an updated direction of the electrical device. However, all the steps in FIG. 7 have been described in detail above, and therefore the description will not be repeated. Note that the steps in FIG. 7 can be implemented as program codes or circuits, and the disclosure is not limited thereto. In addition, the method in FIG. 7 can be applied to the AR device 100 or a general electrical device such as a smart phone, a tablet, or any suitable wearable device. The electrical device at least includes a processor, a depth sensor, and an inertial measurement unit.

In the above-mentioned positioning method and AR device, the problem that SLAM and IMU cannot correctly provide the position and orientation information indoor is solved by combining point cloud information, IMU and PCR technology. It also solves the problem that the IMU will accumulate errors for a long time. This positioning method can be applied to any indoor environment with 3D models or an indoor field such as a factory area or interior space having a tool machine designed by CAD software.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A positioning method for an electrical device comprising a depth sensor and an inertial measurement unit, the positioning method comprising:
    calculating an initial position and an initial direction of the electrical device according to signals obtained from the inertial measurement unit;
    obtaining an environment point cloud from a database, and obtaining a partial environment point cloud from the environment point cloud according to the initial position and the initial direction;
    obtaining a read point cloud by the depth sensor; and
    matching the read point cloud and the partial environment point cloud to calculate an updated position and an updated direction of the electrical device, wherein matching the read point cloud and the partial environment point cloud comprises solving a following equation (1), $$\arg\min_{(R,t)} \Sigma_{i=1}^{N} w_i \|Rp_i + t - q_i\|^2 \quad (1)$$

wherein $p_i$ is an $i^{th}$ point of the read point cloud, $q_i$ is an $i^{th}$ point of the partial environment point cloud, the point $q_i$ is matched to the point $p_i$, $w_i$ is a weight corresponding to the point $p_i$ and the point $q_i$, R is a translation matrix, t is a shift vector, and N is a number of points of the read point cloud.

2. The positioning method of claim 1, wherein the weight $w_i$ is negatively correlated to a distance between the point $q_i$ and ($Rp_i$+t).

3. The positioning method of claim 2, wherein each of the point $p_i$ and the point $q_i$ comprises an X coordinate, a Y coordinate, a Z coordinate, and a normal vector.

4. The positioning method of claim 3, further comprising:
    obtaining the point $p_i$ and a plurality of neighboring points thereof from the read point cloud; and
    performing a principle component analyze to the point $p_i$ and the neighboring points to obtain a plurality of eigenvalues and a plurality of principle components, and setting the principle component corresponding to smallest one of the eigenvalues as the normal vector of the point $p_i$.

5. The positioning method of claim 4, wherein each of the point $p_i$ and the point $q_i$ further comprises a curvature factor, and the positioning method further comprises:
    dividing the smallest one of the eigenvalues by a sum of the eigenvalues to calculate the curvature factor.

6. An augmented reality device comprising:
    an inertial measurement unit;
    a depth sensor; and
    a processor configured to perform a plurality of steps:
        calculating an initial position and an initial direction of the augmented reality device according to signals obtained from the inertial measurement unit;
        obtaining an environment point cloud from a database, and obtaining a partial environment point cloud from the environment point cloud according to the initial position and the initial direction;
        obtaining a read point cloud by the depth sensor; and
        matching the read point cloud and the partial environment point cloud to calculate an updated position and an updated direction of the augmented reality device, wherein matching the read point cloud and the partial environment point cloud comprises solving a following equation (1), $$\arg\min_{(R,t)} \Sigma_{i=1}^{N} w_i \|Rp_i + t - q_i\|^2 \quad (1)$$

wherein $p_i$ is an $i^{th}$ point of the read point cloud, $q_i$ is an $i^{th}$ point of the partial environment point cloud, the point $q_i$ is matched to the point $p_i$, $w_i$ is a weight corresponding to the point $p_i$ and the point $q_i$, R is a translation matrix, t is a shift vector, N is a number of points of the read point cloud, and the weight $w_i$ is negatively correlated to a distance between the point $q_i$ and ($Rp_i$+t).

7. The augmented reality device of claim 6, wherein each of the point $p_i$ and the point $q_i$ comprises an X coordinate, a Y coordinate, a Z coordinate, and a normal vector, and the steps further comprise:
  obtaining the point $p_i$ and a plurality of neighboring points thereof from the read point cloud; and
  performing a principle component analyze to the point $p_i$ and the neighboring points to obtain a plurality of eigenvalues and a plurality of principle components, and setting the principle component corresponding to smallest one of the eigenvalues as the normal vector of the point $p_i$.

8. The augmented reality device of claim 7, each of the point $p_i$ and the point $q_i$ further comprises a curvature factor, and the steps further comprise:
  dividing the smallest one of the eigenvalues by a sum of the eigenvalues to calculate the curvature factor.

* * * * *